UNITED STATES PATENT OFFICE.

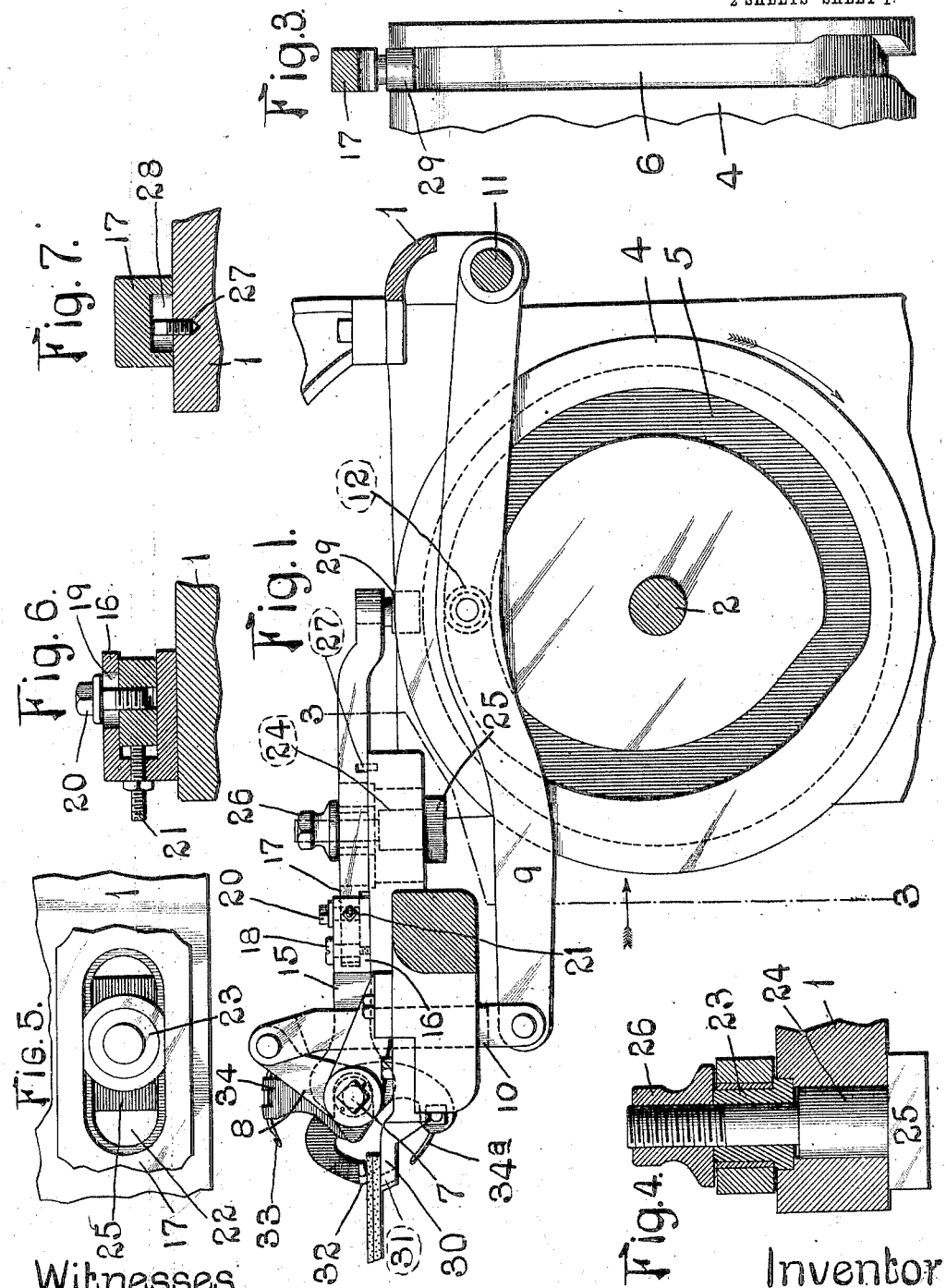

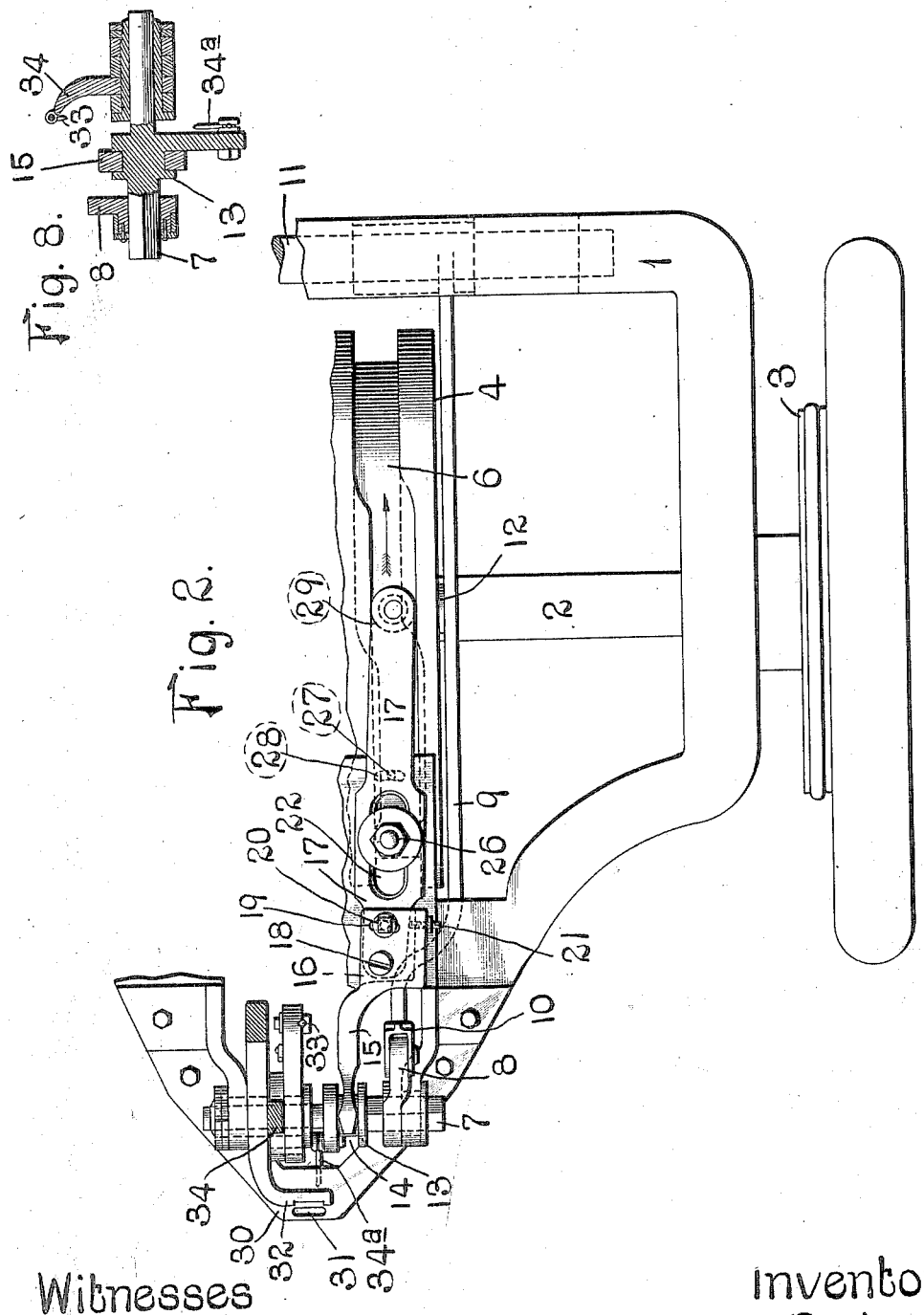

CHRISTIAN PEDERSEN, OF ST. LOUIS, MISSOURI, ASSIGNOR TO LANDIS MACHINE COMPANY, OF ST. LOUIS, MISSOURI, A CORPORATION OF MISSOURI.

MECHANISM FOR ADJUSTING THE LENGTHS OF STITCHES IN SEWING-MACHINES.

No. 811,582. Specification of Letters Patent. Patented Feb. 6, 1906.

Application filed August 14, 1905. Serial No. 274,115.

*To all whom it may concern:*

Be it known that I, CHRISTIAN PEDERSEN, a citizen of the United States, residing at St. Louis, Missouri, have invented a certain new and useful Improvement in Mechanisms for Adjusting the Length of a Stitch in Sewing-Machines, of which the following is a full, clear, and exact description, such as will enable others skilled in the art to which it appertains to make and use the same, reference being had to the accompanying drawings, forming part of this specification, in which—

Figure 1 is a side elevational view of a portion of a sewing-machine mechanism, showing my invention applied. Fig. 2 is a top plan view of the same. Fig. 3 is a cross-sectional view on the line 3 3 of Fig. 1 looking in the direction indicated by the arrow. Fig. 4 is a cross-sectional view through the fulcrum of the vibrating shifting-lever. Fig. 5 is a top plan view of the fulcrum, the jam-nut being removed. Fig. 6 is a cross-sectional view through the awl-adjusting device. Fig. 7 is a cross-sectional view through the shifting-lever, showing the stop-pin in elevation; and Fig. 8 is a cross-sectional view through the awl-lever the needle-guide presser-foot, and needle-carrier.

This invention relates to mechanism used in connection with sewing-machines for adjusting the parts to control the length of stitch in the work.

One of the objects of the invention is to provide a simple and efficient mechanism capable of governing the length of stitch made by the machine; and the invention consists in certain novel details of construction and combination of parts, all of which will be specifically described hereinafter, reference being had to the accompanying drawings, in which—

The reference-numeral 1 designates a frame carrying a drive-shaft 2, on one end of which is a drive-pulley 3, receiving power from any suitable source. On the shaft 2 is a disk 4, having a cam 5 on one side and a cam 6 in its periphery.

Journaled in the forward portion of the machine on the frame 1 is a rock-shaft 7, having a crank-arm 8 connected to a lever 9 by a link 10, which I term the "needle-bar." The lever 9 is fixed on a rock-shaft 11 at the rear portion of the frame, and intermediate the ends of the lever 9 is a roller 12, working in the cam 5, so that the rotation of the cam will give the proper throw to the lever to rock the shaft 7. The shaft 7 is longitudinally movable of the bearings in which it is journaled and has connected thereto, as shown in Fig. 8, a shifting device 13, having a groove 14 in which one end of a shifter 15 engages. The end of the shifter 15 is provided with an enlarged head 16, having a socket therein in which is secured one end of a vibrating shifting-lever 17. The vibrating shifting-lever 17 is connected to the head 16 by a pivot 18, and in rear of the pivot is a slot 19 in the head 16, through which a fastening device 20 projects to engage the reduced end of the lever 17, which is in the socket of head 16. Through one side of the head projects an adjusting-screw 21, which may engage with the constricted end of the lever 17, as will be presently explained. The shifting-lever 17 is provided with an elongated slot 22, through which projects an adjustable fulcrum 23, connected to a spindle 24 in an elongated slot on the frame 1. The fulcrum 23, which is a sleeve on the spindle, is of greater depth than the thickness of the lever, so that when said spindle, which is provided with a head 25, is held in its adjusted position by the jam-nut 26 the lever 17 will be free to move—that is to say, the lever 17 will be permitted to rock in a horizontal plane, but will be prohibited from having a reciprocatory motion on account of the pin 27, which projects from the rigid part on the machine into the transversely-elongated slot 28 in the lower face of the lever 17. The rear end of lever 17 is provided with a roller 29, which fits in the cam 6 in the periphery of the disk 4, so that the rotation of the disk will impart the necessary sidewise movement to said lever 17.

30 is the work-table, having a guide-slot 31 therein, and 32 designates the presser-foot.

33 is the needle, and 34 the needle-guide.

The power end of the lever 17 being at 29, it is obvious that the greater the distance between the fulcrum of said lever 17 and the point 29 the less throw the shifter 15 will have in moving the awl 34$^a$ during each operation of the disk and the nearer the fulcrum is to the roller 12 the greater will be the movement of the shifter 15, and consequently the greater the movement of the awl, which awl is carried by the shifting device 13. Therefore by changing the fulcrum the shifting of the work during each complete revolution of the disk will be governed to suit existing circumstances. Of course it is desirable that the awl will aline with the needle when the opening is made in the leather or material to be sewed. In making the required adjustment the adjusting device 21 will be operated after loosening the fastening device 20 so as to shift the shifter 15 on its pivot 18, so that the awl will be caused to aline with the needle, and the fastening device 20 will then be caused to bind the shifter 15 rigid with the lever 17. After the awl and the needle are caused to properly aline the fulcrum will be moved to the proper position required to make the desired length of stitch, and the nut 26 will be screwed down tight, so that the spindle 24 will be held rigid with the frame 1. After the parts are thus arranged the rotation of the disk 4 will cause the roller 29 on the lever 17 to vibrate in the cam-groove 6, and thus impart a sidewise movement to the awl, and as the awl will be in the work during the sidewise movement the work will be shifted a sufficient distance to coincide with the length of stitch which it is desired to make. During the time that the sidewise movement is taking place the needle will be out of engagement with the work and the presser-foot 32 will have released the work, so that it will be free to move. The lever 9 and the shifting-lever 17 are so timed with respect to their respective cams that the shaft 7 will not be rocked during the shifting movement, but the awl will first be caused to engage the work, then shift it, then withdraw, then permit the needle to enter the work and withdraw, and then the awl will again enter the work, and a succession of these operations will take place during the sewing of the material.

Having thus described my invention, what I claim, and desire to secure by Letters Patent, is—

1. In a sewing-machine, a slidable awl-carrying element, a lever for sliding the awl-carrying element, a part on the lever engaging the awl-carrying element, and means for effecting an adjustable connection between the said part and the lever to aline the awl with the needle of the sewing-machine; substantially as described.

2. In a sewing-machine, a slidable awl-carrying element, a lever for sliding the awl-carrying element, a part on the lever engaging the awl-carrying element, means for effecting an adjustable connection between said part and the lever, and a variable fulcrum for said lever; substantially as described.

3. In a sewing-machine, a slidable awl-carrying element, a rocking lever for sliding said awl-carrying element and having an elongated slot, a variable fulcrum for said lever in said slot, and means independent of the fulcrum for preventing longitudinal movement of said lever; substantially as described.

4. In a sewing-machine, a shaft, a shiftable awl-carrying element on said shaft, a shifter engaging said awl-carrying element and having a socket, a lever having one end in said socket, and an adjusting device for varying the angle of inclination of the shifter with respect to the lever to aline the awl with the needle of the sewing-machine; substantially as described.

In testimony whereof I hereunto affix my signature, in the presence of two witnesses, this 11th day of August, 1905.

CHRISTIAN PEDERSEN.

Witnesses:
B. F. FUNK,
GEORGE BAKEWELL.